United States Patent
Lee et al.

(10) Patent No.: US 8,743,682 B2
(45) Date of Patent: Jun. 3, 2014

(54) METHOD AND APPARATUS FOR NOTIFYING OF THE OCCURRENCE OF AN EVENT IN A WIRELESS COMMUNICATION SYSTEM

(75) Inventors: Jae Wook Lee, Anyang-si (KR); Sung Jun Park, Anyang-si (KR); Sung Hoon Jung, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 13/519,746

(22) PCT Filed: Jan. 13, 2011

(86) PCT No.: PCT/KR2011/000238
§ 371 (c)(1),
(2), (4) Date: Jun. 28, 2012

(87) PCT Pub. No.: WO2011/087291
PCT Pub. Date: Jul. 21, 2011

(65) Prior Publication Data
US 2012/0281580 A1    Nov. 8, 2012

Related U.S. Application Data

(60) Provisional application No. 61/294,815, filed on Jan. 13, 2010.

(30) Foreign Application Priority Data

Jan. 12, 2011    (KR) .................. 10-2011-0003017

(51) Int. Cl.
*H04L 12/26*    (2006.01)

(52) U.S. Cl.
USPC .......................................... 370/229

(58) Field of Classification Search
USPC ............ 370/335, 252, 311, 315, 229; 455/60
See application file for complete search history.

(56) References Cited

U.S. PATENT DOCUMENTS

| | | | |
|---|---|---|---|
| 2001/0012379 A1* | 8/2001 | Amemiya et al. | 382/103 |
| 2002/0137464 A1* | 9/2002 | Dolgonos et al. | 455/60 |
| 2008/0095185 A1 | 4/2008 | DiGirolamo et al. | |
| 2008/0130588 A1* | 6/2008 | Jeong et al. | 370/335 |
| 2009/0257369 A1* | 10/2009 | Igarashi et al. | 370/311 |
| 2010/0296472 A1 | 11/2010 | Lee et al. | |
| 2011/0292816 A1* | 12/2011 | Lee et al. | 370/252 |
| 2012/0082088 A1* | 4/2012 | Dalsgaard et al. | 370/315 |

FOREIGN PATENT DOCUMENTS

| | | |
|---|---|---|
| CA | 2 401 393 A1 | 8/2001 |
| CA | 2 715 075 A1 | 8/2009 |
| KR | 10-0606881 B1 | 7/2006 |
| KR | 10-2009-0016431 A | 2/2009 |
| KR | 10-2009-0082851 A | 7/2009 |
| KR | 10-2009-0085116 A | 8/2009 |

* cited by examiner

*Primary Examiner* — Chandrahas Patel
*Assistant Examiner* — Lan Huong Truong
(74) *Attorney, Agent, or Firm* — Birch, Stewart, Kolasch & Birch, LLP

(57) ABSTRACT

Disclosed is a preamble transmission method performed by a terminal in a wireless communication system. The preamble transmission method performed by a terminal in a wireless communication system includes detecting the occurrence of an event, and transmitting a preamble corresponding to the detected event to a network through a random access channel (RACH). Congestion in a wireless network can be reduced, and a procedure for notifying of the occurrence of an event can be simplified.

10 Claims, 11 Drawing Sheets

METHOD AND APPARATUS FOR NOTIFYING OF THE OCCURRENCE OF AN EVENT IN A WIRELESS COMMUNICATION SYSTEM

CROSS REFERENCE TO RELATED APPLICATIONS

This application is the National Phase of PCT/KR2011/000238 filed on Jan. 13, 2011, which claims priority under 35 U.S.C. 119(e) to U.S. Provisional Application No. 61/294,815 filed on Jan. 13, 2010 and under 35 U.S.C. 119(a) to Patent Application No. 10-2011-0003017 filed in Korea, on Jan. 12, 2011, all of which are hereby expressly incorporated by reference into the present application.

BACKGROUND OF THE INVENTION

1. Field of the Invention

The present invention relates to wireless communications, and more particularly, to a method of reporting an event occurrence in a wireless communication system and an apparatus supporting the method.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

Recently, a machine type communication (MTC) system which performs communication between machines without intervention of a human user is actively utilized. A service provided through MTC is differentiated from the conventional communication service requiring human intervention, and its service range is various as follows. For example, the MTC provides various services such as tracking, metering, monitoring, payment, medical field services, remote controlling, etc., and is extended to various fields.

An MTC device which is a user equipment used in MTC may have a limited mobility. According to a characteristic of the MTC device, a plurality of MTC devices may be distributed in a wide area or may be installed in an environment where a human access is limited. Therefore, it may be difficult to maintain and manage the user equipment.

In case of occurrence of various events, for example, a case where downlink channel quality deteriorates depending on a change of a wireless channel environment, a case of being in a jamming condition, a case where the user equipment is damaged, a case where a result must be transmitted to a base station while performing a task assigned to the user equipment such as metering, tracking, observing, etc., there is a need to consider a method capable of effectively reporting the event occurrence without causing an excessive load to a wireless network.

SUMMARY OF THE INVENTION

The present invention provides a method and apparatus for reporting an event occurrence in a wireless communication system.

In an aspect, a preamble transmission method performed by a user equipment in a wireless communication system includes detecting an occurrence of an event, and transmitting a preamble corresponding to the detected event to a network through a random access channel (RACH).

The user equipment for transmitting the preamble may be in an RRC_IDLE state.

The preamble may be a preamble dedicated to the event.

The detecting of the event occurrence may be performed on the basis of a first threshold value.

The first threshold value may be received from the network by using system information.

The dedicated preamble may be repetitively transmitted within a range of the maximum number of times of transmission.

The first threshold value may be a default value.

The detecting of the event occurrence may detect a case where channel quality between the network and the user equipment is decreased to be less than or equal to the first threshold value.

The detecting of the event occurrence may detect a case where a remaining battery amount of the user equipment is decreased to be less than or equal to the first threshold value.

The detecting of the event occurrence may detect an invasion.

Upon detecting the invasion, at least one of an invader image, a detection time, and a detection place may be included and transmitted.

If the remaining battery amount of the user equipment is decreased to be less than or equal to the first threshold, an identifier (ID) of the user equipment may be further included and transmitted.

If the remaining battery amount of the user equipment is detected between the first threshold value and a second threshold value different from the first threshold value, the first threshold value and the second threshold value may be transmitted.

The detecting of the event occurrence may detect a jamming.

In the detecting of the jamming, at least one of a location of the user equipment, a jamming detection time, and a jamming signal strength may be included and transmitted.

When a user equipment cannot properly receive data delivered through a downlink channel due to deterioration of downlink channel quality of the user equipment, the user equipment can report the downlink channel quality deterioration to a base station without additional information transmission in such a manner that the user equipment transmits to the base station a dedicated preamble for reporting the downlink channel quality deterioration. In addition to reporting the downlink channel quality deterioration, the dedicated preamble can be used to report the occurrence of various events to the base station, thereby being able to decrease a situation of causing a congestion of a wireless network.

DESCRIPTION OF EXEMPLARY
EMBODIMENTS

Figure 1:
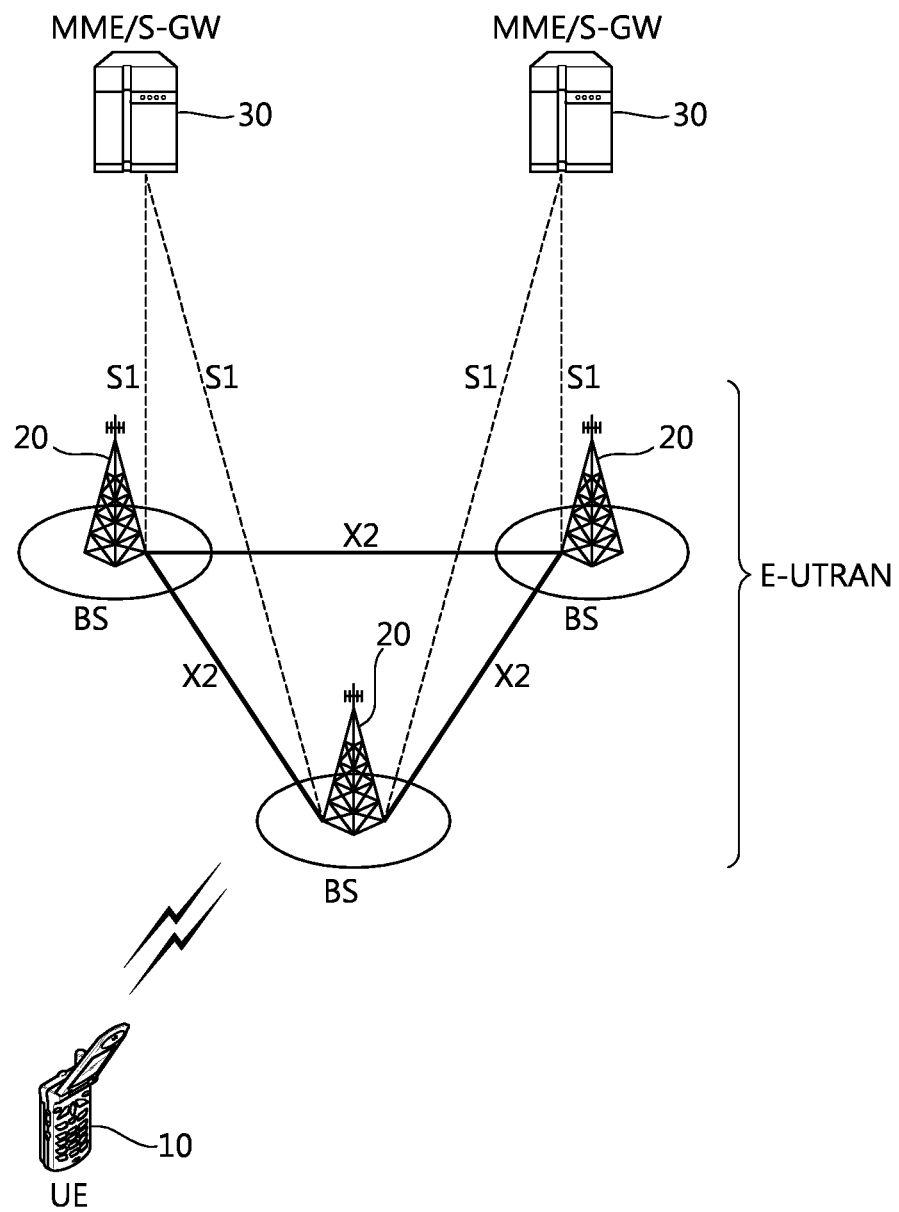
FIG. 1 shows an example of a wireless communication system to which the present invention is applicable.

FIG. 1 shows an example of a wireless communication system to which the present invention is applicable. The present invention can apply to an evolved-UMTS terrestrial radio access network (E-UTRAN) or a long term evolution (LTE)/LTE-A system.

The LTE system is a mobile communication system evolved from the UMTS system, and its standardization work is under progress in the 3$^{rd}$ generation partnership project (3GPP) which is an international standard organization.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Figure 2:
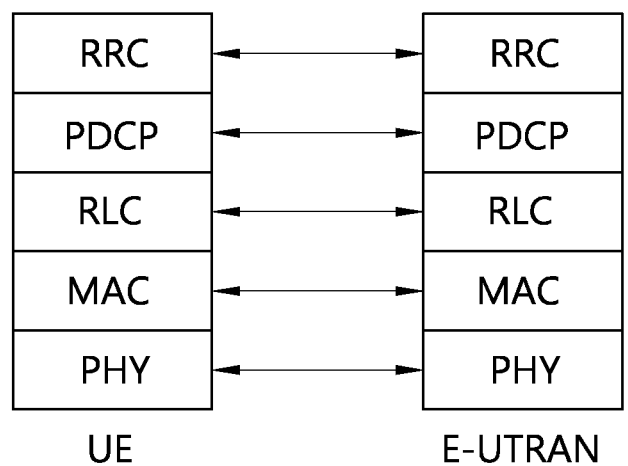
FIG. 2 and FIG. 3 each show a structure of a C-plane and a U-plane of a radio protocol of an LTE system.
Figure 3:
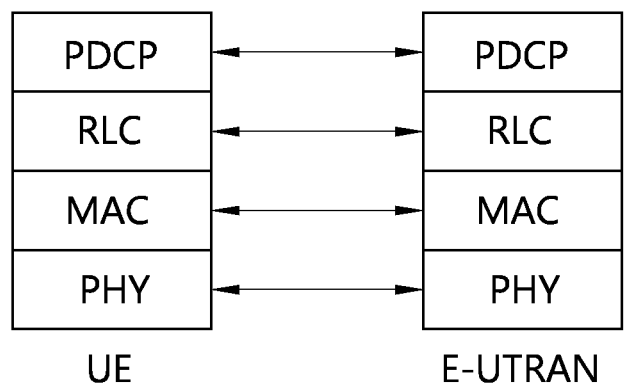

A radio interface protocol is defined in a Uu interface which is a radio section. The radio interface protocol horizontally consists of a physical layer, a data link layer, and a network layer, and is vertically divided into a user plane (U-plane) for user data transmission and a control plane (C-plane) for control signal delivery (signaling). On the basis of the three lowest layers of a well-known open system interconnection (OSI) standard model, as shown in FIG. 2 and FIG. 3, the radio interface protocol can be generally divided into a first layer (L1) including a physical (PHY) layer, a second layer (L2) including medium access control (MAC)/radio link control (RLC)/packet data convergence protocol (PDCP) layers, and a third layer (L3) including a radio resource control (RRC) layer. These layers are present in pair in a UE and an E-UTRAN, and serve for data transmission of the Uu interface.

FIG. 2 and FIG. 3 each show a structure of a C-plane and a U-plane of a radio protocol of an LTE system.

A PHY layer, which is a first layer, provides an information transfer service to a higher layer by using a physical channel. The PHY layer is connected with a higher layer, i.e., a MAC layer, through a transport channel. Data between the MAC layer and the PHY layer is transferred through the transport channel. In this case, the transport channel is roughly divided into a dedicated transport channel and a common transport channel according to whether to share the channel. Further, between different PHY layers, i.e., between a PHY layer of a transmitting side and a PHY layer of a receiving side, data is transferred through a physical channel by using a radio resource.

There are several layers in the second layer. First, a MAC layer serves to map various logical channels to various transport channels, and also serves to perform logical channel multiplexing in which several logical channels are mapped to one transport channel. The MAC layer is connected with a higher layer, i.e., an RLC layer, through a logical channel. According to a type of information to be transmitted, the logical channel is roughly divided into a control channel for transmitting information of the C-plane and a traffic channel for transmitting information of the U-plane.

An RLC layer of the second layer serves to regulate a data size so that the data size is suitable to transmit data by a lower layer to a radio section by segmenting and concatenating data received from a higher layer. In addition, to ensure a variety of quality of service (QoS) required by each radio bearer (RB), the RLC layer provides three operation modes, i.e., a transparent mode (TM), an unacknowledged mode (UM), and an acknowledged mode (AM). In particular, the AM RLC performs a retransmission function by using an automatic repeat request (ARQ) for reliable data transmission.

A PDCP layer of the second layer performs a header compression function for decreasing an Internet protocol (IP) packet header size which is relatively great and which contains unnecessary control information in order to effectively perform transmission in a radio section having a small bandwidth when transmitting an IP packet such as IPv4 or IPv6. This serves to increase transmission efficiency of the radio section by allowing only necessary information to be transmitted in a header part of data. In addition, in the LTE system, the PDCP layer also performs a security function which consists of ciphering for avoiding data interception and integrity protection for avoiding data manipulation of a third party.

An RRC layer located in the uppermost part of the third layer is defined only in the C-plane. The RRC layer serves to control the logical channel, the transport channel, and the physical channel in association with configuration, reconfiguration and release of radio bearers (RBs). Herein, the RB implies a logical path provided by the first and second layers for data delivery between the UE and the UTRAN. In general, the setup of the RB implies a process for specifying a radio protocol layer and channel properties required to provide a particular service and for determining respective detailed parameters and operations. The RB can be classified into two types, i.e., a signaling RB (SRB) and a data RB (DRB). The SRB is used as a path for transmitting an RRC message in the C-plane. The DRB is used as a path for transmitting user data in the U-plane.

Examples of a downlink transport channel for transmitting data from the network to the UE include a broadcast channel (BCH) for transmitting system information and a downlink shared channel (SCH) for transmitting user traffic or a control message. A control message or traffic of downlink multicast or broadcast services may be transmitted through the downlink SCH, or may be transmitted through an additional downlink multicast channel (MCH). Meanwhile, examples of an uplink transport channel for transmitting data from the UE to the network include a random access channel (RACH) for transmitting an initial control message and an uplink shared channel (SCH) for transmitting user traffic or a control message.

Examples of a logical channel located on a higher layer of the transport channel and mapped to the transport channel include a broadcast channel (BCCH), a paging control channel (PCCH), a common control channel (CCCH), a multicast control channel (MCCH), a multicast traffic channel (MTCH), etc.

A physical channel consists of several sub-frames located on a time axis and several sub-carriers located on a frequency axis. Herein, one sub-frame consists of a plurality of symbols on the time axis. One sub-frame consists of a plurality of RBs. One RB consists of a plurality of symbols and a plurality of sub-carriers. In addition, each sub-frame may use specific sub-frames of specific symbols (e.g., a first symbol) of a corresponding sub-frame for a physical downlink control channel (PDCCH), i.e., L1/L2 control channels. One sub-frame has a length of 0.5 ms. A transmission time interval (TTI) which is a unit time for data transmission is 1 ms corresponding to two sub-frames.

Hereinafter, an RRC state of a UE and an RRC connection method will be described. The RRC state implies whether an RRC of the UE is logically connected to an RRC of an E-UTRAN. If connected, it is an RRC_CONNECTED state, and if not connected, it is an RRC_IDLE state. Since the RRC connection exists in the UE in the RRC_CONNECTED state, the E-UTRAN can recognize a presence of the UE in a cell unit, and thus can effectively control the UE. On the other hand, the UE in the RRC_IDLE state cannot recognize the presence of the UE, and is managed by the core network in a tracking area (TA) unit which is a greater area unit than a cell. That is, regarding the UE in the RRC_IDLE state, only the presence/absence of the UE is recognized in the greater area unit than the cell, and in order to receive a mobile communication service such as voice and data, the UE must transition to the RRC_CONNECTED state. Each TA is identified by using a tracking area identifier (TAI). The UE can configure the TAI by using a tracking area code (TAC) as information which is broadcast in the cell.

When the user first turns on power of the UE, the UE first searches for a proper cell and thereafter establishes an RRC connection in the cell, and then registers information of the UE to the core network. Thereafter, the UE remains in the RRC_IDLE state. The UE in the RRC_IDLE state (re)selects a cell according to necessity, and examines system information or paging information. This is called that the UE camps on the cell. The UE in the RRC_IDLE state establishes an RRC connection with an RRC of an E-UTRAN through an RRC connection procedure only when there is a need to establish the RRC connection, and then transitions to the RRC_CONNECTED state. There are several cases where the UE in the RRC_IDLE state needs to establish the RRC connection. Examples of the cases include a case where uplink data transmission is required due to user's call attempts or a case where a response message is transmitted in response to a paging message upon receiving the paging message from an E-UTRAN.

Hereinafter, a paging procedure and an operation of a UE when a corresponding message is received will be described. Paging is used in case of delivering paging information by a core network to a UE in the RRC_IDLE state, in case of reporting a change in system information, and in case of delivering emergent information. Further, paging is used in case of reporting the change in the system information by a BS to a UE in the RRC_CONNECTED state.

As described above, since location information on the UE in the RRC_IDLE state is managed by the core network in a TA unit, the core network does not know a cell in which the UE is currently located. Accordingly, the core network delivers a paging message to all BSs included in a TA list, and upon receiving the paging message, the BS broadcasts the paging message in a cell of the BS. In this case, the BS broadcasts the paging message in a paging occasion (PO). The PO is a sub-frame for providing information on transmission of the paging message, and is calculated based on an ID of the UE. The UE in the RRC_IDLE state reads the subframe by calculating the PO on the basis of the ID of the UE. The UE receives the paging message on the basis of information regarding reception of the paging message delivered through the subframe, and determines whether the ID of the UE is included in the message. If the ID of the UE is included in the message, the UE establishes an RRC connection, or receives system information, or reads emergent information. Otherwise, if the ID of the UE is not included in the received paging message, the UE discards the paging message.

Next, system information will be described. The system information includes essential information that must be known to a UE to access a BS. Thus, the UE has to completely receive system information before accessing the BS. Further, the UE has to always have the latest system information. Since the system information is information that must be known to all UEs in one cell, the BS periodically transmits the system information.

The system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, one SIB includes only information of a neighbor cell, and another SIB includes only information of an uplink radio channel used by the UE.

Hereinafter, cell (re)selection will be described. When power of a UE is turned on, the UE must select a cell having proper quality to perform preparation procedures for receiving a service. The UE in an RRC_IDLE state must select the cell having proper quality all the time, and thus must be prepared to receive the service through the cell. For example, the UE of which power has been just turned on must select the cell having proper quality so as to be registered to a network. If the UE which has been in an RRC_CONNECTED state enters the RRC_IDLE state, the UE must select a cell in which the UE itself resides. In this manner, a process of selecting a cell satisfying a certain condition by the UE in order to remain in a service waiting state such as the RRC_IDLE state is called a cell selection. The cell selection is performed in a state where the UE does not currently determine a cell in which the UE itself resides in the RRC_IDLE state, and thus it is very important to select the cell as quickly as possible. Therefore, if a cell provides radio signal quality greater than or equal to a specific criterion, the cell may be selected in the cell selection process of the UE even if the cell is not a cell providing best radio signal quality to the UE.

If the UE selects a cell satisfying the cell selection criterion, the UE receives information required for an operation of the RRC_IDLE state of the UE, that is, an RRC_IDLE mode operation, in the corresponding cell from the system information of the corresponding cell. The UE receives all the information required for the RRC_IDLE mode operation, and then waits in an idle mode to request a service (for example, originating call) to a network or receive the service (for example, terminating call) from the network.

After the UE selects a certain cell through a cell selection process, the signal strength and quality between the UE and the BS may be changed due to the change of a UE mobility and a wireless environment. Therefore, if the quality of the selected cell deteriorates, the UE may select another cell providing better quality. If a cell is reselected in this manner, a cell providing signal quality better than that of a currently selected cell is selected in general. This process is called a cell reselection. A basic purpose of the cell reselection process is generally to select a cell providing best quality to the UE from the perspective of the radio signal quality. In addition to the perspective of the radio signal quality, the network may notify the UE of its priority by determining the priority for each frequency. The UE which has received the priority may consider this priority more preferentially than the radio signal quality criterion during the cell reselection process.

Hereinafter, a random access (RA) procedure will be described.

The RA procedure provided in an LTE system is classified into a contention based random access procedure and a non-contention based random access procedure. The classification into the contention based random access procedure and the non-contention based random access procedure is determined according to whether a random access preamble used in the random access procedure is directly selected by a UE or is selected by an eNB.

In the non-contention based random access procedure, the UE uses a random access preamble assigned directly to the UE by the eNB. Therefore, when the eNB assigns the specific random access preamble only to the UE, the random access preamble uses only by the UE, and other UEs do not use the random access preamble. Accordingly, since the random access preamble and the UE which uses the random access preamble are related in a 1:1 manner, there may be no contention. In this case, it may be effective since the eNB can know the UE which transmits the random access preamble as soon as receiving the random access preamble.

On the contrary, in the contention based random access procedure, since any random access preamble is transmitted by being selected from random access preambles that can be used by the UE, there is always a possibility that a plurality of UEs use the same random access preamble. Therefore, even if the eNB receives a specific random access preamble, there is no way to know which UE transmits the random access preamble.

The UE can perform the random access procedure in a case where the UE performs initial access since there is no RRC connection with the eNB, a case where the UE first accesses to a target cell in a handover procedure, a case where it is requested by an instruction of the eNB, a case where uplink data is generated in a situation where the UE is not time-synchronized in uplink or a designated radio resource used to request a radio resource is not allocated, or in case of a recovery procedure when radio link failure or handover failure occurs.

Figure 4:
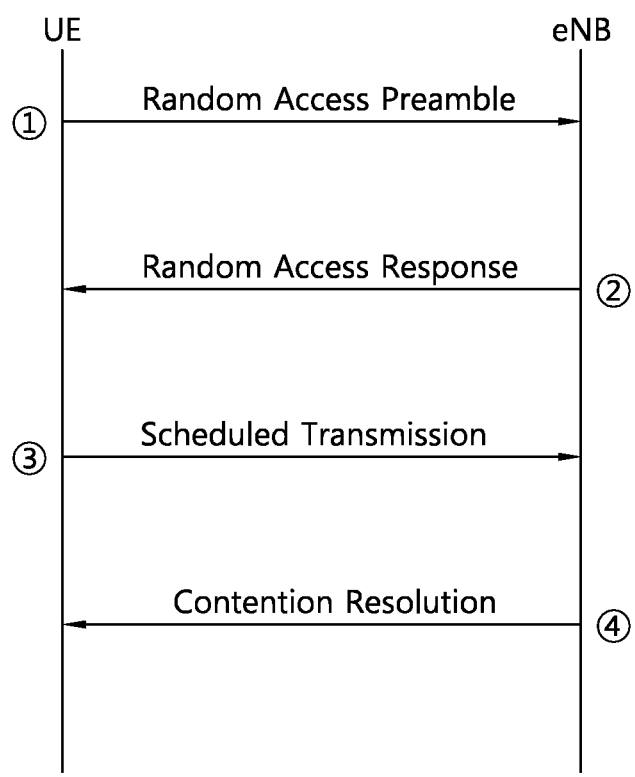
FIG. 4 shows operations of a UE and an eNB in a contention based random access procedure.

FIG. 4 shows operations of a UE and an eNB in a contention based random access procedure.

In the contention based random access procedure, the UE randomly selects one random access preamble from a group of random access preambles indicated by system information or a handover command, selects a PRACH resource capable of transmitting the random access preamble, and performs transmission. In this case, the preamble is called an RACH MSG 1.

After the UE transmits the random access preamble as described above, the UE attempts to receive its random access response within a random access response reception window indicated by the system information or the handover command of the eNB. More specifically, random access response information (often called an RACH MSG 2) is transmitted in a format of a MAC PDU, and the MAC PDU is delivered through a PDSCH. In addition, a PDCCH is also delivered so that the information delivered through the PDSCH is properly received by the UE. That is, the PDCCH includes information of the UE which must receive the PDSCH, frequency and time information of a radio resource of the PDSCH, a transmission format of the PDSCH, etc. Once the UE successfully receives the PDCCH delivered to the UE, the UE properly receives a random access response transmitted through the PDSCH according to a plurality of pieces of information of the PDCCH. Further, the random access response includes a random access preamble identifier (ID), an uplink radio resource (i.e., an uplink (UL) grant), a temporary cell ID (i.e., temporary C-RNTI), and time alignment values (i.e., time alignment commands). Since one random access response can include random access response information for one or more UEs, the random access preamble ID is necessary to report a specific UE for which the uplink radio resource, the temporary cell ID, and the time alignment value information are valid. The random access preamble ID coincides with a random access preamble selected by the UE in the first step.

When the UE receives a random access response which is valid for the UE, a plurality of pieces of information included in the random access response are respectively processed. That is, the UE applies the time alignment value, and stores the temporary cell ID. In addition, by using the uplink radio resource, the UE transmits data stored in a buffer of the UE or newly generated data to the eNB. In this case, data transmitted through the uplink radio resource, that is, a MAC PDU, is often called an RACH MSG 3. Among data included in the uplink radio resource (hereinafter, also referred to as a message 3) must include an ID of the UE. This is because the eNB cannot determine which UEs perform the random access procedure in the contention based random access procedure, and the UE must be identified for contention resolution at a later time.

There are two methods as a method of including the ID of the UE. In a first method, if the UE has a valid cell ID previously assigned in a corresponding cell before the random access procedure, the UE transmits its cell ID through the uplink radio resource. Otherwise, if the valid cell ID is not assigned to the UE before the random access procedure, the UE performs transmission by including its unique ID (e.g., S-TMSI or random ID). In general, the unique ID is longer than the cell ID. If data is transmitted through the uplink radio resource, the UE starts a contention resolution timer.

After the UE transmits data including its ID through the uplink radio resource included in the random access response, the UE waits for an instruction of the eNB for contention resolution. That is, reception of the PDCCH is attempted to receive a specific message. There are also two methods as a method of receiving the PDCCH. As described above, if its ID transmitted through the uplink radio resource is a cell ID, the UE attempts to receive the PDCCH by using its cell ID, and if the ID is a unique ID, the UE attempts to receive the PDCCH by using the temporary cell ID included in the random access response. Thereafter, in the former case, if the UE receives the PDCCH (hereinafter, referred to as a message 4) by using its cell ID before the expiration of the contention resolution timer, the UE determines that the random access procedure is normally performed, and ends the random access procedure. In the latter case, if the UE receives the PDCCH by using the temporary cell ID before the expiration of the contention resolution timer, the UE confirms data (hereinafter, referred to as a message 4) delivered by a PDSCH indicated by the PDCCH. If its unique ID is included in content of the data, the UE determines that the random access procedure is normally performed, and ends the random access procedure. A MAC PDU or message received in the fourth step is often called an RACH MSG 4.

Figure 5:
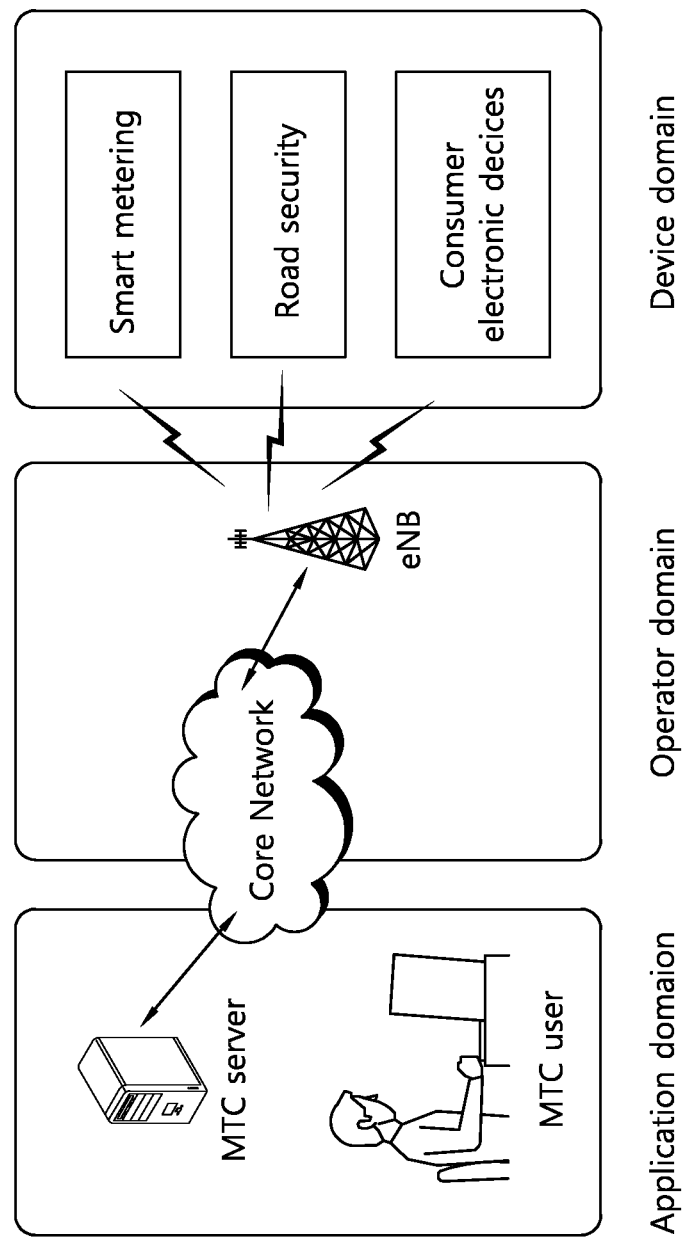
FIG. 5 is a schematic view showing an overall structure of an MTC system to which the present invention is applicable.

FIG. 5 is a schematic view showing an overall structure of an MTC system to which the present invention is applicable.

An MTC device communicates with another MTC device or an MTC server through a mobile communication network (i.e., PLMN). The MTC server can provide an MTC user with metering, road information, consumer electronic device control, etc., provided via the MTC device as shown in FIG. 5.

To effectively support the MTC service, a property of the MTC device can be taken into account. The property of the MTC device may be low mobility, time tolerance, small data transmission, etc. In addition, it must be considered that many MTC devices can exist in one cell.

In the following description of the present invention, a UE may be an MTC device or a UE performing an MTC function in addition to a typical UE of an LTE system or an LTE-A wireless communication system. Although it is assumed that the UE is the MTC device in the description of the embodiment of the present invention, this is for exemplary purposes only, and thus the present invention is not limited to the MTC system and the MTC device.

When downlink channel quality of the UE deteriorates due to jamming, channel interference, etc., the UE cannot properly receive a downlink signal delivered from an eNB. In such a situation, the UE needs to report this fact to the eNB. In case of a UE being in an RRC_CONNECTED state, if there is an assigned uplink channel resource, the UE may report downlink channel deterioration to the eNB by using the resource. However, if there is no assigned uplink channel resource, the uplink channel resource must be assigned to the UE. For this, the UE may request the eNB to assign the uplink resource by using an RA procedure. In case of a UE being in an RRC_IDLE state, the UE performs the RA procedure to transmit data to the eNB. In the two cases above, the UE can successfully complete the RA procedure only when downlink channel reception is properly achieved. However, since the downlink channel cannot be properly received due to downlink channel quality deterioration, there is a high possibility that the UE cannot successfully complete the RA procedure.

If the downlink channel reception is not properly achieved in a situation where the downlink quality deteriorates, there is a need for a method for reporting to the eNB that the UE cannot perform downlink reception for an RRC connection and cannot perform proper reception from the eNB due to deterioration of the downlink quality, without having to establish the RRC connection through the RA procedure and without having to receive downlink data by the UE. In a case where the UE needs to report to the eNB that a specific event occurs in a situation where downlink channel reception is limited in addition to the downlink quality situation, various situations can be assumed to report the event occurrence to the eNB without having to establish the RRC connection. Alternatively, even if downlink channel reception is possible, it may be more effective to directly report the event occurrence without the RRC connection establishment procedure than reporting of the event occurrence by establishing the RRC connection through the RA procedure in a sense that a radio resource can be effectively utilized and a situation of causing a congestion of a wireless network can be decreased.

The present invention proposes a method of detecting an event occurrence by a UE in the aforementioned various situations and reporting the event occurrence to an eNB.

Figure 6:
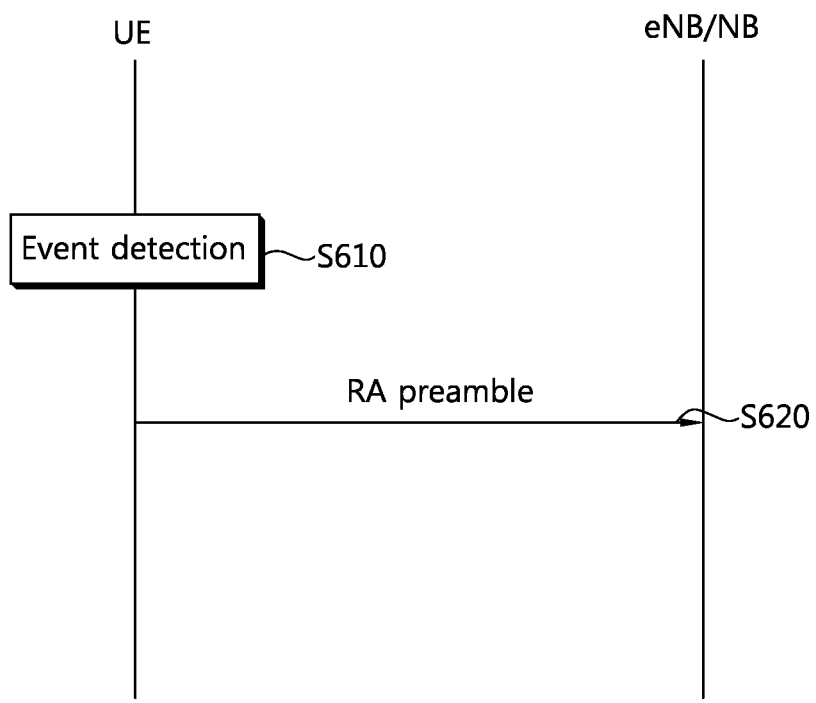
FIG. 6 is a flowchart showing an operation of a UE according to an embodiment of the present invention.

FIG. 6 is a flowchart showing an operation of a UE according to an embodiment of the present invention.

When the UE detects an event occurrence (step S610), the UE transmits to an eNB an RA preamble used in an RA procedure without establishing an RRC connection (step S620) and thus can report a specific event occurrence to the eNB. The RA preamble of FIG. 6 is an example of a report message for reporting the event occurrence to the eNB. The report message may include additional information depending on the detected event. A threshold which is used as a criterion for the event detection may be a value which is set to the UE or may be transmitted to the UE through signaling. The threshold may have a plurality of values (e.g., a $1^{st}$ threshold, a $2^{nd}$ threshold, . . . , an $n^{th}$ threshold). An occurrence of a new event can be detected whenever reaching (or not reaching) each of the thresholds and an event occurrence reporting procedure can proceed.

In this case, the UE may operate in an RRC_IDLE state. In addition, the RA preamble transmitted by the UE to the eNB may be a dedicated preamble for reporting the specific event occurrence. Therefore, upon receiving the dedicated preamble, the eNB can know that a specific event occurs in the UE by only receiving the dedicated preamble. Alternatively, the RA preamble may include event occurrence information.

In the example of FIG. 6, the UE may transmit the RA preamble several times within an allowed range. If the RA preamble is transmitted repetitively, the UE can transmit the RA preamble by regulating transmission power thereof, which will be described below as one of detailed embodiments.

The event detected by the UE in step S610 may be various such as a case where downlink quality deteriorates (a case where downlink quality decreases to be less than or equal to a threshold), a case where a remaining battery amount of the UE is decreased to be less than or equal to a threshold, a case where a situation to be reported to the eNB occurs according to a task assigned to the UE (e.g., where a forest fire occurs within a surveillance area in case of a UE for observing the forest fire, or where an intruder is detected in case of a UE for security), a case where a damage or functional error of the UE is detected, etc. Hereinafter, a detailed example of the event and an operation of the UE based thereon will be described. In detailed embodiments of FIG. 7 to FIG. 10, a method of determining a dedicated preamble and acquiring dedicated preamble information and its attendant information, a method of transmitting the dedicated preamble, and a method of determining an event occurrence can be combined for use even if it is not mentioned in each embodiment. An event of each embodiment is for exemplary purposes only, and thus can be replaced with the aforementioned various events.

Figure 7:
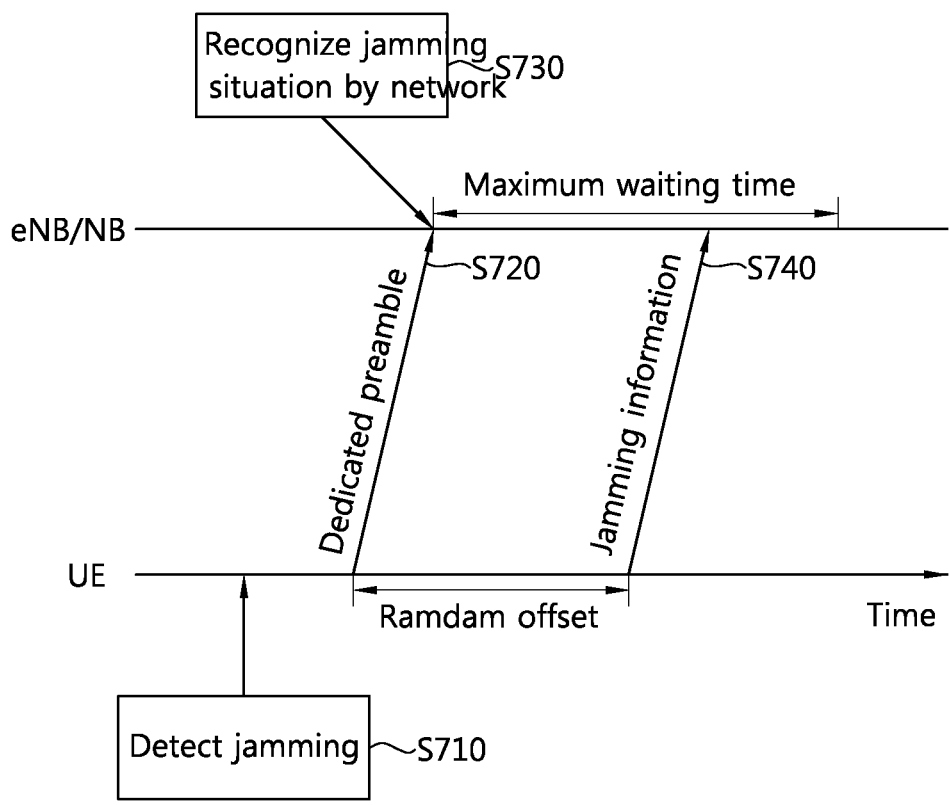
FIG. 7 is a message flowchart showing a situation of reporting jamming detection to an eNB when a UE detects jamming.

FIG. 7 is a message flowchart showing a situation of reporting jamming detection to an eNB when a UE detects jamming.

When the UE detects a jamming situation (step S710), the UE transmits a dedicated preamble to the eNB to report the detection of the jamming situation (step S720). Since downlink signaling by the eNB is not necessary in a process of transmitting the dedicated preamble by the UE, the UE can know that the eNB is in a state of having jamming through transmission of the dedicated preamble even in a situation where the UE has jamming.

The dedicated preamble transmitted by the UE is an RA preamble dedicated to report that it is in the jamming situation. Therefore, the eNB can know that the UE is in the jamming situation by only receiving the dedicated preamble (step S730). The dedicated preamble may include location information of the transmitting UE, a time at which jamming is detected, and information regarding strength of a jamming signal.

In order for the eNB to be able to acquire detailed information related to a jamming condition, the UE may transmit the dedicated preamble (step S720), and may transmit jamming information to the eNB after a random offset (step S740). The UE may transmit the jamming information to the eNB without explicit uplink resource assignment from the eNB. The jamming information transmitted by the UE to the eNB may include location information of the UE transmitting the jamming information, a time at which the jamming is detected, and information related to strength of a jamming signal. Upon receiving the dedicated preamble, the eNB may wait to receive the jamming information that can be transmitted by the UE within a maximum waiting time range.

As another example of jamming information transmission, the UE may perform an RRC connection establishment procedure, and may transmit the jamming information in an RRC_CONNECTED state. When the UE reports downlink channel deterioration to the eNB by using an RA procedure, the eNB may assign a dedicated RA preamble for the above situation. If a channel deterioration situation is detected as shown in the example of FIG. 7, the UE may report the channel deterioration situation to the eNB by attempting RA by the use of the assigned dedicated RA preamble.

Figure 8:
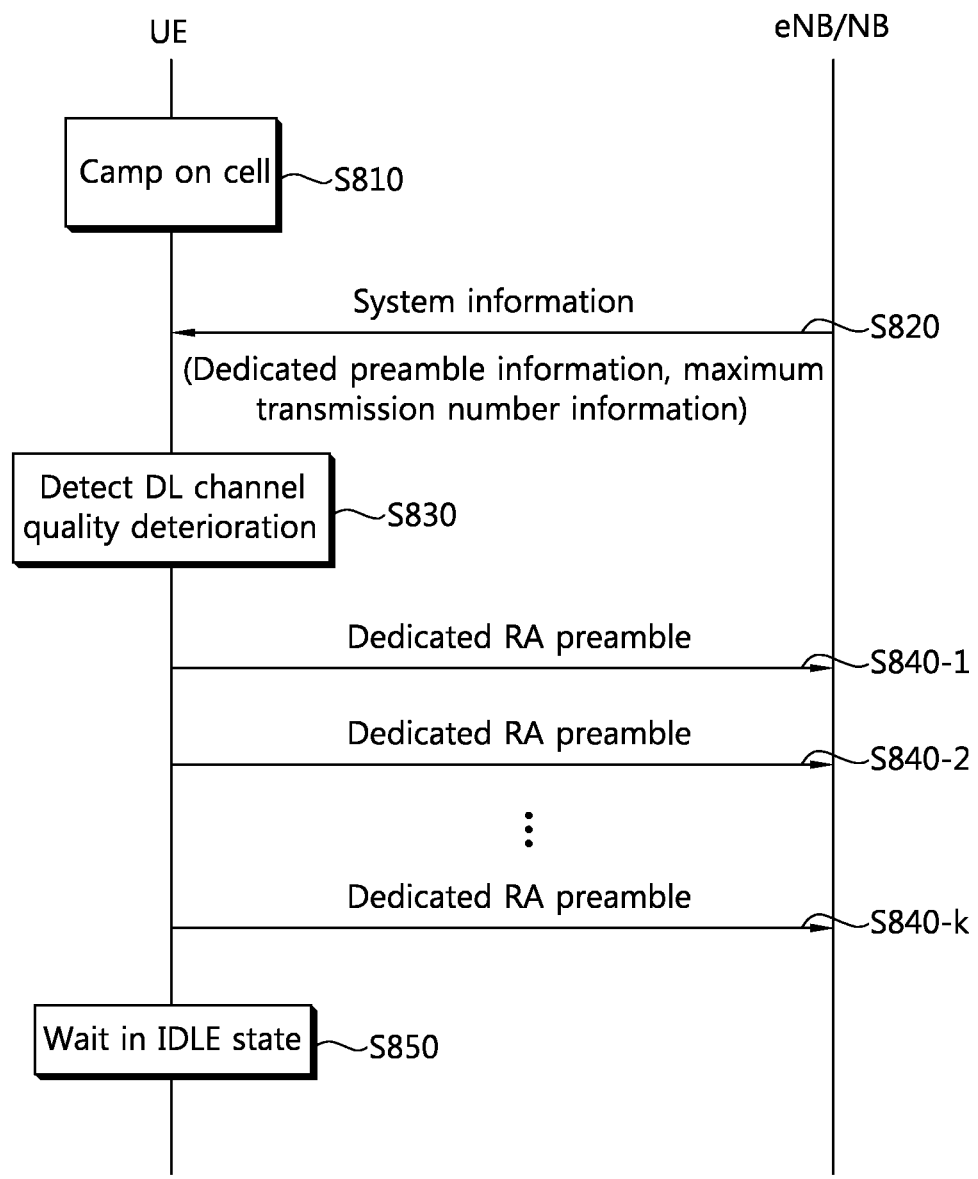
FIG. 8 is a message flowchart between a UE and an eNB for reporting an event occurrence according to an embodiment of the present invention.

FIG. 8 is a message flowchart between a UE and an eNB for reporting an event occurrence according to an embodiment of the present invention.

A UE being in an RRC_IDLE state (re)selects a cell according to the existing cell (re)selection procedure and camps on the cell (step S810). The UE may remain in the RRC_IDLE state or an RRC_CONNECTED state.

The UE receives system information which is broadcast in a (re)selected cell (step S820). In this case, the system information may include maximum transmission number information in addition to dedicated preamble information for reporting specific event occurrence (in the example of FIG. 8, downlink channel quality deterioration). The maximum transmission number information is the maximum allowed number of times of transmitting the dedicated RA, preamble by the UE to the eNB.

In the example of FIG. 8, the UE in the RRC_IDLE or RRC_CONNECTED state receives the dedicated preamble information and the maximum transmission number information by using the system information transmitted in the cell. However, this is for exemplary purposes only, and thus when the UE is in the RRC_CONNECTED state, the UE can receive and configure the dedicated preamble information and the maximum transmission number information by using a UE-specific RRC message transmitted by the eNB.

Upon detection of downlink channel quality deterioration (step S830), the UE transmits to the eNB a dedicated RA preamble acquired from the system information in step S820 and assigned to report downlink channel quality deterioration (steps S840-1, S840-2, . . . , S840-k). As an example of detecting the downlink channel quality deterioration by the UE, if the UE confirms that a latest channel quality value is worse than a threshold in comparison with an average of N previous channel quality values, the UE may detect the downlink quality deterioration and determine to start dedicated RA preamble transmission to report the downlink channel quality deterioration to the eNB.

More specifically, the UE measures N previous channel qualities other than a current channel quality, and then calculates an average thereof. In this case, the value N may be a predetermined value. Alternatively, the channel quality may be a measurement result received from a physical channel. The UE compares the current channel quality with the channel quality average value calculated above, and if a difference thereof is greater than or equal to a specific threshold, may determine that a channel condition deteriorates.

The UE transmits a dedicated RA preamble to establish an RRC connection with the eNB (step S840-1), and waits for a response from the eNB. In this case, the UE may transmit the dedicated RA preamble by selecting a PRACH resource.

If there is no response from the eNB, after a predetermined fixed time elapses, the UE may transmit the dedicated RA preamble to the eNB with higher transmission power than previous transmission (step S840-2). After the predetermined fixed time elapses, the UE can transmit the preamble to the eNB with higher transmission power than previous transmission until reaching a predetermined transmission number.

Figure 9:
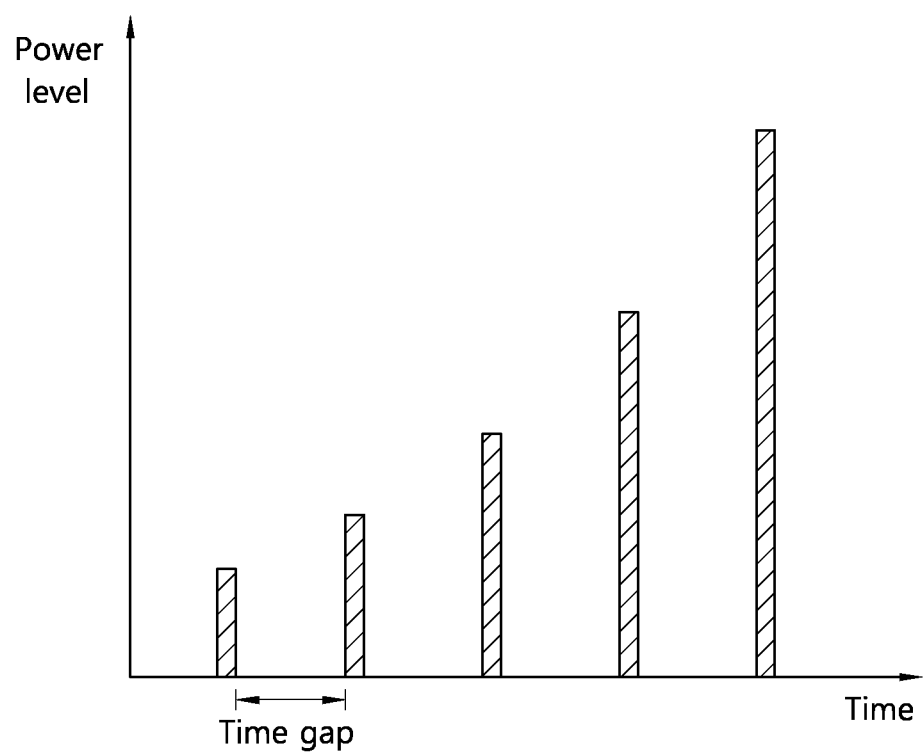
FIG. 9 shows an example of transmitting a dedicated RA preamble within a range of the maximum allowed number of times of transmission by increasing transmission power along with the increase in the number of times of transmission.

FIG. 9 shows an example of transmitting a dedicated RA preamble within a range of the maximum allowed number of times of transmission by increasing transmission power along with the increase in the number of times of transmission. At the elapse of a time corresponding to a time gap after transmission of the dedicated RA preamble, the UE may retransmit the dedicated RA preamble within the range of the maximum allowed number of times of transmission. In this case, the time gap may be a predetermined value or may be any value.

For another embodiment, the process of steps S840-1 to S840-k for transmitting the dedicated RA preamble of the example of FIG. 8 can be transmitted by a predetermined number of times of transmission without having to wait for a response for the preamble transmission for the eNB.

Upon reporting the event occurrence to the eNB by transmitting the dedicated RA preamble, the UE may wait in the RRC_IDLE state (step S850), and may perform its operation.

Figure 10:
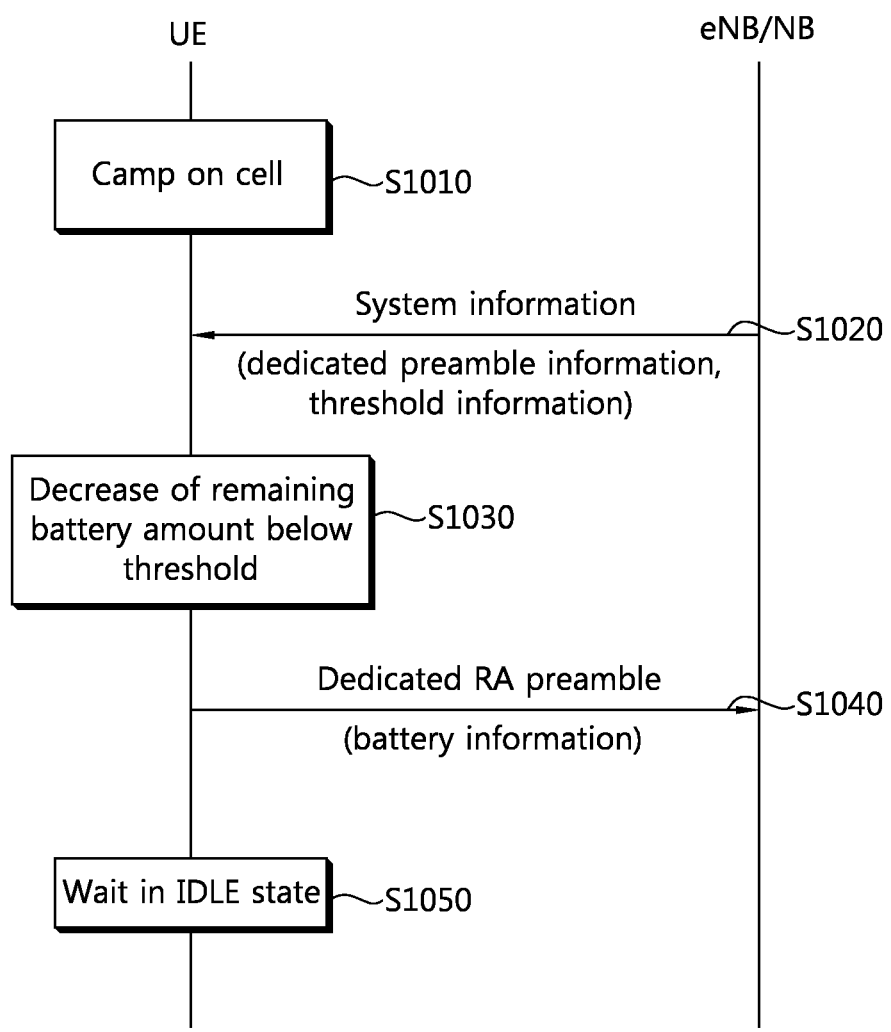
FIG. 10 is a message flowchart between a UE and an eNB for reporting an event occurrence according to another embodiment of the present invention.

FIG. 10 is a message flowchart between a UE and an eNB for reporting an event occurrence according to another embodiment of the present invention.

In the example of FIG. 10, the event occurrence reported by the UE to the eNB is a situation where a remaining battery amount of the UE is decreased to be less than or equal to a threshold. As described above, the situation where the remaining battery amount of the UE is decreased to be less than or equal to the threshold is only for an example of the event occurrence, and may be replaced with a situation where downlink channel quality is decreased to be less than or equal to a threshold, a situation where a functional error or damage occurs in the UE, a situation where an intruder appears in an area monitored by the UE, a situation where the UE has a monitoring result to be reported to the eNB, etc. In this case, in the following description, an RRC connection is established through the dedicated RA preamble or after transmission of the RA preamble, and additional information that can be transmitted may differ depending on a replaced event. For example, if the situation where the intruder appears in the area monitored by the UE is assumed as an event for starting a reporting procedure, additional information that can be transmitted in this case may include image information of the intruder, a time at which the intruder is detected, information of a location at which the intruder is detected, etc.

The UE camps on a cell (step S1010). The UE receives system information (step S1020). Therefore, the UE can acquire threshold information and dedicated preamble information included in system information. In this case, when a remaining battery amount of the UE is decreased to be less than or equal to a threshold, the dedicated preamble information may be dedicated RA preamble assignment information used to report the decrease of the remaining battery amount to the eNB. The threshold information may be information regarding the battery remaining amount which is used as a criterion in the determining of whether the UE will transmit the dedicated RS preamble to the eNB. The threshold information may include a plurality of thresholds which are used as a criterion of the event occurrence. For a detailed example, the battery remaining amount may be decreased to be less than or equal to a $1^{st}$ threshold, a $2^{nd}$ threshold, and a $3^{rd}$ threshold, and whenever reaching each threshold, the event occurrence may be detected and a reporting procedure may be performed. A current battery remaining amount of the UE may be transmitted by being included in the dedicated RA preamble as additional information, or may be transmitted to the eNB after an RRC connection is established. As described with reference to FIG. 8, the dedicated preamble information and the threshold information may be acquired by using a UE-specific RRC message transmitted by the eNB when the UE operates in the RRC_CONNECTED state.

At the occurrence of a situation where the remaining battery amount of the UE is decreased to be less than or equal to the threshold (step S1030), the UE transmits the dedicated RA preamble (step S1040). In this case, as described with reference to FIG. 8, the dedicated RA preamble may be retransmitted within a range of the maximum allowed number of times of transmission, and may be transmitted by increasing transmission power in the retransmission process.

Upon reporting the event occurrence to the eNB by transmitting the dedicated RA preamble (i.e., the decrease in the remaining battery amount below the threshold), the UE may wait in the RRC_IDLE state (step S850) and then may perform its operation.

Figure 11:
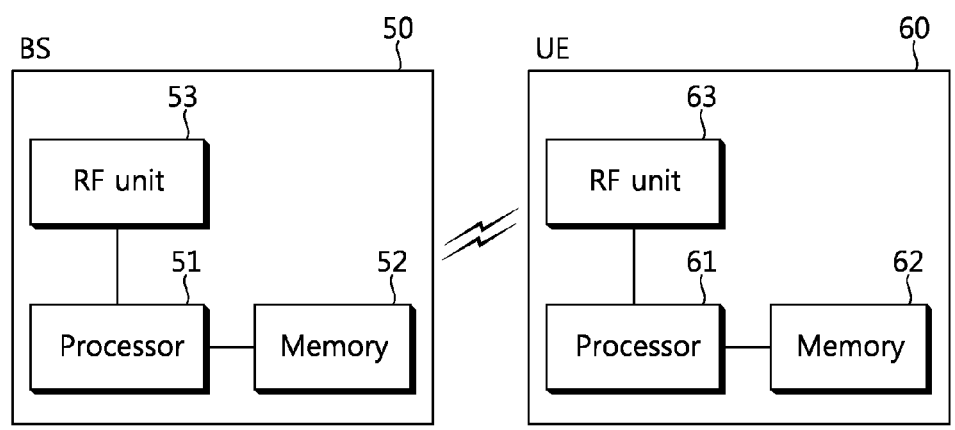
FIG. 11 is a block diagram showing a wireless communication system according to an embodiment of the present invention.

FIG. 11 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal.

The processor 51 implements the proposed functions, procedures, and/or methods. Layers of a radio interface protocol can be implemented by the processor 51. The processor 51 can implement an operation of the BS in the procedure described with reference to FIG. 4 and in the embodiments described with reference to FIG. 6 to FIG. 10.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal.

The processor 61 implements the proposed functions, procedures, and/or methods. Layers of a radio interface protocol can be implemented by the processor 61. The processor 61 can implement an operation of the UE in the procedure described with reference to FIG. 4 and in the embodiments described with reference to FIG. 6 to FIG. 10.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A preamble transmission method performed by a user equipment (UE) in a wireless communication system, the method comprising:
   receiving, by the UE, a UE specific Radio Resource Control (RRC) message from a network,
   wherein the UE specific RRC message includes a plurality of dedicated preambles for reporting an occurrence of event,
   wherein the UE specific RRC message further includes maximum transmission number information indicating a maximum number of transmissions of the dedicated preamble by the UE, and
   wherein the UE specific RRC message is received by the UE only when the UE is in an RRC connected state;
   detecting, by the UE, an occurrence of an event,
   wherein the detecting of the occurrence of the event is performed by using a first threshold value,
   wherein the first threshold value is received from the network through system information; and
   transmitting a dedicated preamble corresponding to the detected event to a network through a random access channel (RACH),
   wherein the dedicated preamble is selected from among the plurality of dedicated preambles included in the UE specific RRC message,
   wherein the preamble is a dedicated preamble that is dedicated to the detected event,
   wherein the transmission of the dedicated preamble is performed when the UE is in an RRC idle state,
   wherein the transmission of the dedicated preamble is performed by selecting a PRACH resource capable of transmitting the dedicated preamble, and
   wherein the dedicated preamble is repetitively transmitted within a range of a maximum number of transmissions.

2. The method of claim 1, wherein the first threshold value is a default value.

3. The method of claim 1, wherein the detecting of the event occurrence detects a case where channel quality between the network and the user equipment is decreased to be less than or equal to the first threshold value.

4. The method of claim 1, wherein the detecting of the event occurrence detects a case where a remaining battery amount of the user equipment is decreased to be less than or equal to the first threshold value.

5. The method of claim 1, wherein the detecting of the event occurrence detects an invasion.

6. The method of claim 5, wherein upon detecting the invasion, at least one of an invader image, a detection time, and a detection place is included and transmitted.

7. The method of claim 4, wherein if the remaining battery amount of the user equipment is decreased to be less than or equal to the first threshold, an identifier (ID) of the user equipment is further included and transmitted.

8. The method of claim 4, wherein if the remaining battery amount of the user equipment is detected between the first threshold value and a second threshold value different from the first threshold value, the first threshold value and the second threshold value are transmitted.

9. The method of claim 1, wherein the detecting of the event occurrence detects a jamming.

10. The method of claim 9, wherein in the detecting of the jamming, at least one of a location of the user equipment, a jamming detection time, and a jamming signal strength is included and transmitted.

* * * * *